Patented Mar. 12, 1940

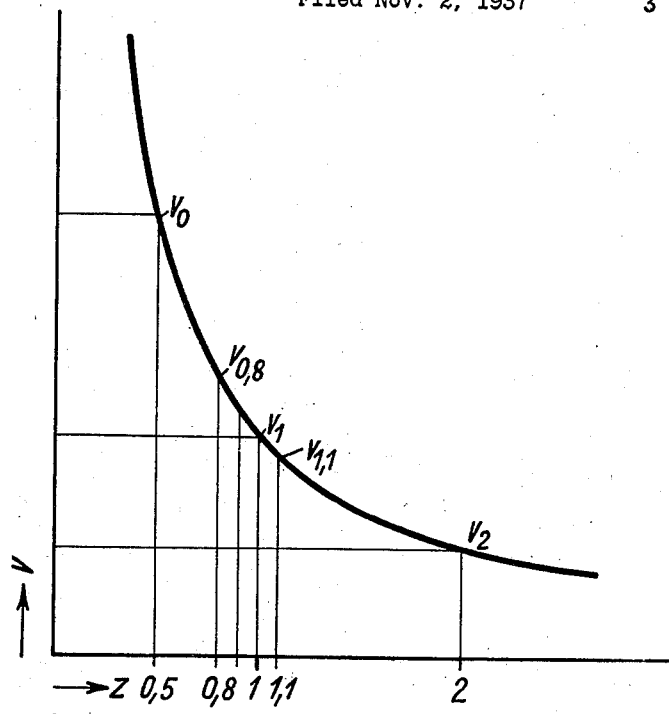
Fig. 1
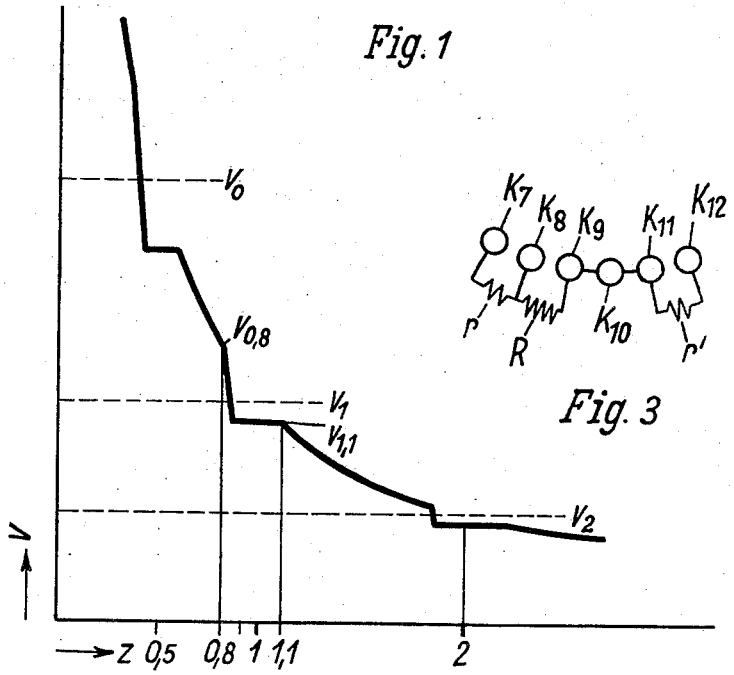
Fig. 2
Fig. 3

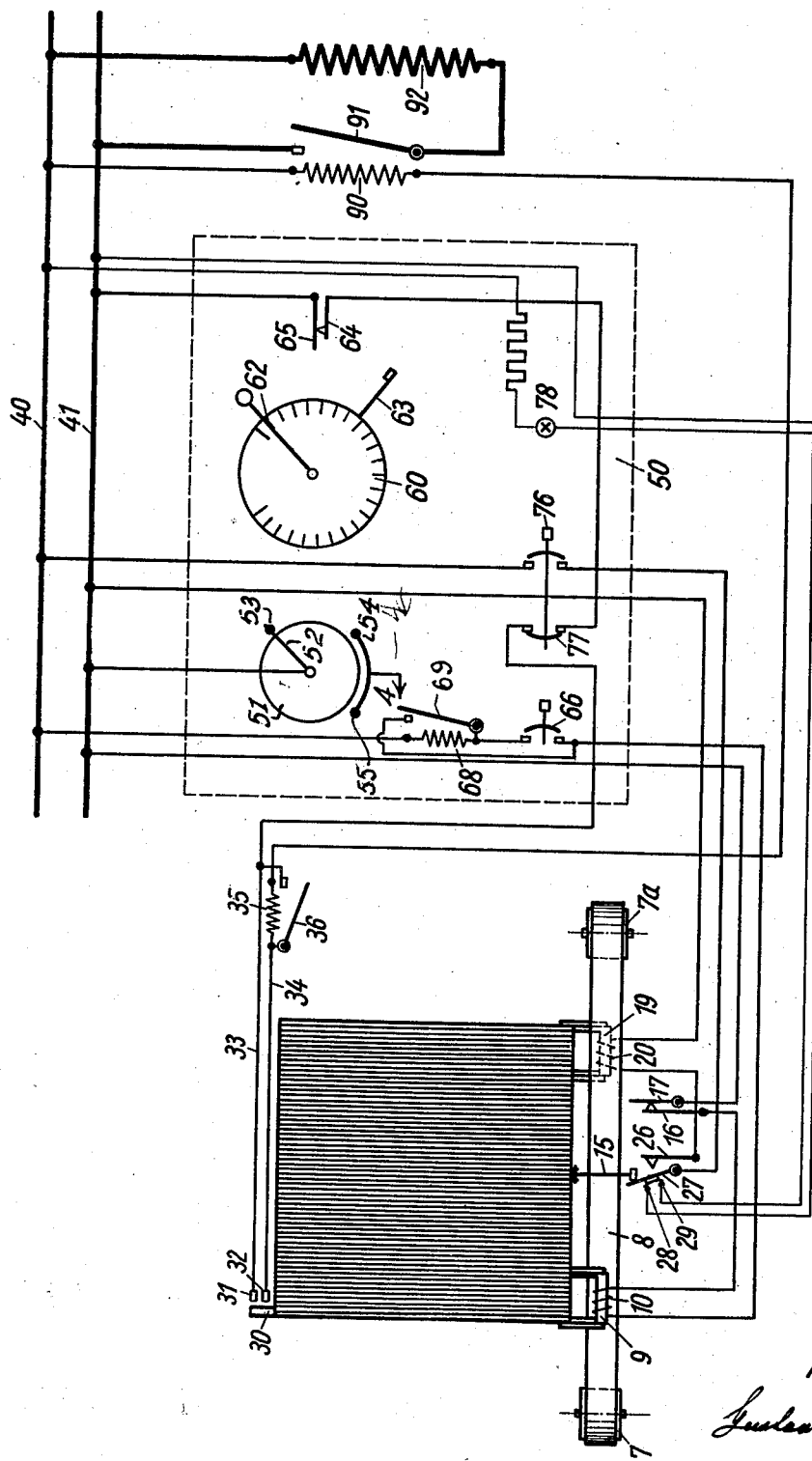

2,193,330

UNITED STATES PATENT OFFICE 2,193,330

SCATTERED RAY DIAPHRAGM

Gustav Grossmann, Berlin-Zehlendorf, Germany

Application November 2, 1937, Serial No. 172,373
In Germany November 4, 1936

10 Claims. (Cl. 250—62)

This invention relates to grids, used in making radiographs, and more particularly to "Bucky" grids.

One of the objects of the invention is to provide for controlling the speed of operation of a grid from some convenient point, from a switchboard for example, as well as actuating the said grid from said point.

Another object of the invention is to provide for actuating a grid from a convenient point, a switchboard for example, and controlling or regulating the speed of operation of said diaphragm in conjunction with the means for indicating the duration of the exposure.

Another object of the invention is to provide for actuating a grid from a convenient point, a switchboard for example, and controlling or regulating the speed of operation of said grid in conjunction with the means for adjusting time of the exposure.

Another object of the invention is to provide for the selective operation, from a convenient point, a switchboard for example, of means for moving the grid from one end position to the other, and of means for moving it back again.

A further object of the invention is to eliminate those speeds of operation of the grid which cause the production of stripe-like shadows.

The invention, as well as these and other objects of the invention, will be readily understood from the following description, taken in connection with the accompanying drawings, of one illustrative embodiment of the invention, the true scope of the invention being pointed out in the appended claims.

In the drawings:

Figures 1 and 2 illustrate how the critical speeds of the grid movement are cut out.

Figure 3 shows diagrammatically illustrative step means for controlling or regulating the speed of the grid.

Figure 5 shows diagrammatically the same parts as Figure 4, but in top plan view and with the electrical connections.

Figure 4:
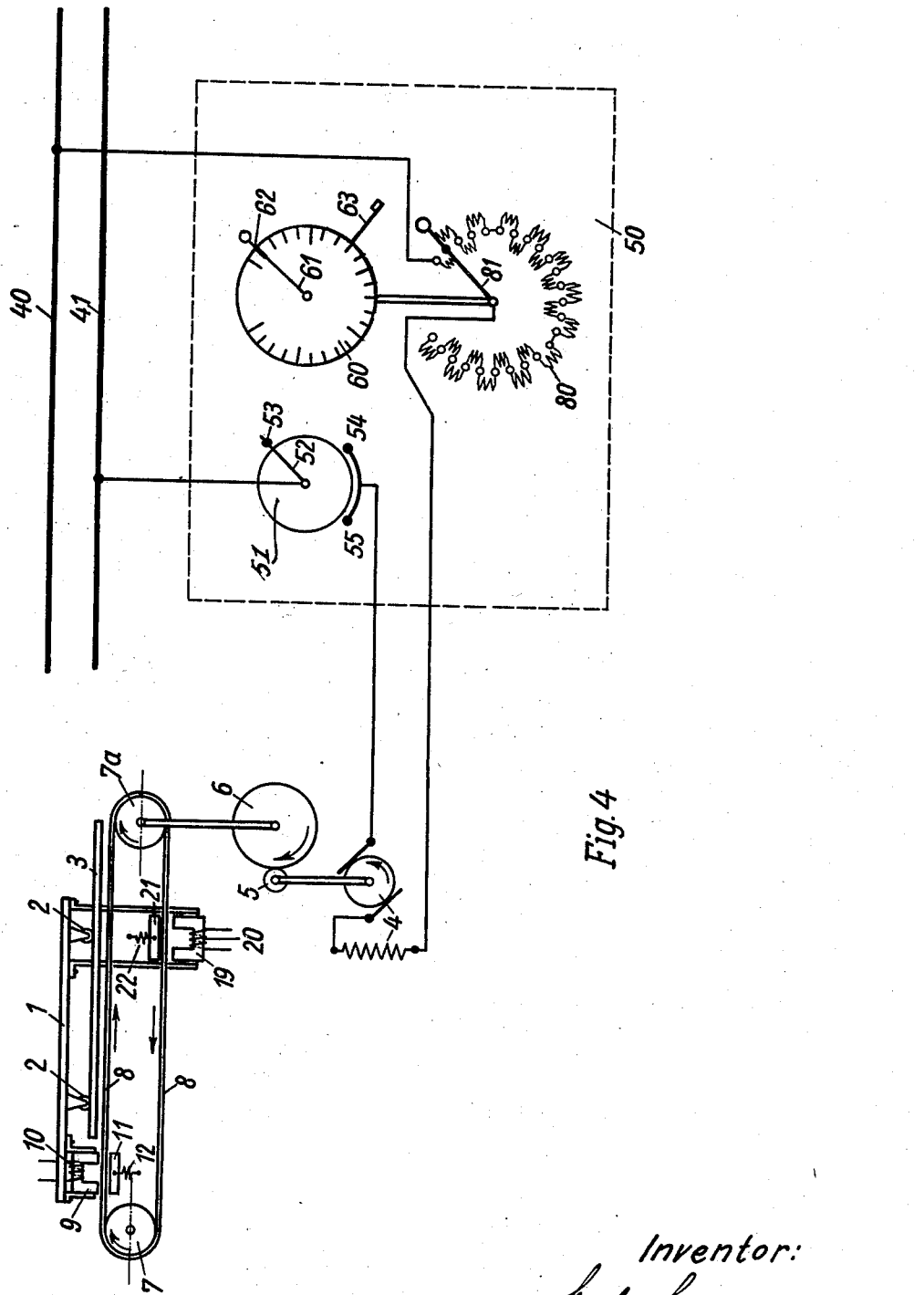
Figure 4 is in greater part a diagrammatic elevational of a "Bucky" grid, its actuating means and the means upon a switchboard for controlling or switching said actuating means on and off.

Among the technical operating advantages of my invention, it will be noted that the control of the operation of the grid (its return to its starting position before starting the exposure and the adjustment or regulation of its speed) which heretofore had always to be effected on the grid itself, can now be effected from a switchboard or other convenient point. If the speed regulating means be connected to a time lag relay, which regulates the time of exposure, or with the means for indicating the time of exposure, then, in addition to simplifying the operation, the adjustment of speed of the grid to correspond to the time of exposure cannot be overlooked. Faulty exposures, such as often occur today either through neglect to regulate or adjust the speed of the grid or to adjust said speed in accordance with the time of exposure, are thus avoided.

Films made with a "Bucky" grid, often show band-like shadows. The contrast between said shadows and the exposed portions between them often varies in different exposures. It is often so great that the value of the film is greatly diminished. Such band-shadows always occur, when the projection of the shadows made by the grid elements coincides with the high spots of the X-ray tube voltage.

To avoid such shadows, it has been proposed to vary the size of the spaces between grid elements lengthwise of the grid. Such grids, however, are suited to making exposures only under special conditions, and still less to radioscopy, as the variation in the grid spacing injuriously affects the radioscopic picture.

The present invention overcomes this difficulty by so regulating or adjusting the speed of the grid, that all speeds which give rise to such band shadows, are eliminated. Such speeds are herein called "critical speeds."

I have found that such band-shadows occur most strongly, when the time period required for the grid to move through a distance $d$ equal to half the space between two consecutive grid elements, equals the phase difference $t$ of two successive peaks of the X-ray tube voltage, that is to say when the grid speed equals $$\frac{d}{t}$$

If this speed be designated by $v_k$, then in the case of a half wave apparatus, $t=T$; $T$ being the period or cycle of the alternating or rotary current for operating the X-ray apparatus in the case of a full-valve rectifying apparatus $$t=\frac{T}{2}$$

and in the case of a 3-phase full-wave rectifying apparatus $$t=\frac{T}{6}$$

Band-shadows of the first category occur, when the speed V of the grid equals $$v_k, \frac{v_k}{2}, \frac{v_k}{3} \text{ etc.} \ldots$$

in general is equal to $$\frac{v_k}{m}$$

$m$ being a whole number. As $m$ increases, the contrast between the band-shadows and the most exposed portions of the film decreases. When $$v=v_k, \frac{2}{3}v_k, \frac{2}{5}v_k \text{ etc.} \ldots$$

band shadows of the second category occur, and when $$v=3v_k, \frac{4}{3}v_k$$

band-shadows of the third category occur, etc. . . . The appearance of the band-shadows formation, is so selective, that a small variation in the grid speed from any one of the critical speeds will suffice to produce a picture free from band-shadows.

In order that always the same number of grid elements shall pass over any point of the film during the exposure, whatever may be the time of exposure used, the speed $v$ of the grid will be so adjusted or regulated that it shall be inversely proportional to the time of exposure Z, and shall vary with the time of exposure Z as indicated by the parabola in Fig. 1. In said figure grid speeds $v_0$, $v_1$ and $v_2$ corresponding to the times of exposure 0.5, 1.0 and 2.0s, designate critical speeds of the grid diaphragm.

In accordance with the present invention, in order to prevent the grid from moving at the critical speed $v_0$ or $v_1$ or $v_2$ when the device is adjusted for a time of exposure 0.5 or 1 or 2s, the increase of resistance of the step by step regulator, which regulates or adjusts the speed of the grid will be discontinuously variable for each unit of length of the circumference in such manner that the broken curve shown in Fig. 2 shall represent the grid speed in dependence on the time of exposure Z. The arrangement will be such that the grid speed shall remain unchanged and equal to $v_1.1$ within the range of $Z=1.1s$ to about $Z=0.85s$ ($v_1.1$ indicating the speed corresponding to $Z=1.1$ according to Fig. 1) and on the passage from $Z=0.85s$ to $Z=0.8s$, suddenly rises to the ordinate value $v_0.3$ corresponding to the curve in Fig. 1. This discontinuous spot will preferably be given a Z-value which shall lie between two scale divisions of the time lag relay.

In practice this is accomplished by short-circuiting the contact studs $K_9$, $K_{10}$, $K_{11}$ carried by a suitable mounting of insulating material (not shown) on the speed regulator for the grid (see Fig. 3) corresponding to scale divisions 0.9s, 1.0s and 1.1s of the step regulator for regulating the grid speed, and throwing in a resistance R, corresponding to the entire speed difference $v_0.8-v_1.1$ (see Fig. 1) between the contact studs $K_8$ and $K_9$ corresponding to the scale divisions 0.8s and 0.9s of the time lag relay. Said resistance R is a multiple of the resistances $r, r'$ which are between $K_7$ and $K_8$ or $K_{11}$ and $K_{12}$ respectively. The same procedure is adopted in respect to the points of the regulating resistance to which correspond the critical grid speeds $v_0$, $v_2$ etc. . . .

In Figures 4 and 5 is shown an illustrative embodiment of the invention comprising a "Bucky" grid moved as described, controlled from a distance and the speed of operation of which is positively regulated or adjusted, as well as the switches and connection for its operation. In said figures said grid is in starting position which it occupies before beginning an exposure; the X-ray apparatus is switched off or disconnected, all the switches on the switchboard are in off position and the time lag relay or exposure timing means is adjusted for the desired time of exposure.

In said illustrative embodiment of the invention, a "Bucky" grid 1 (see Fig. 4) is provided with guide rolls 2 which run upon guide rails 3, said grid being conveniently driven by a motor 4, a series motor or three phase motor, for example, of any suitable convential construction. Said motor drives said grid through suitable driving connection, herein a driving gear 5, 6 and endless belt 8. Normally said grid is disconnected from said driving gear, means being provided to connect it thereto when desired. Any suitable means may be provided for that purpose without departing from the scope of the invention. Herein said means comprising conveniently two electromagnets 9, 10, 11 and 19, 20, 21, one of which serves to move said grid in one direction, the other in the other direction. Means as hereinafter more fully described are provided for energizing said magnets from any suitable source of electrical energy, such as line wires 40, 41.

Magnet core 9 is carried by said grid upon one side of the upper section of said belt, the vertically movable armature 11 of said magnet being located upon the opposite side of said belt-section. The belt is driven by said motor in the direction indicated by the arrows in Figure 4, so that when said magnet 9, 10, 11 is energized, said belt will be clamped between said core and said armature and said grid will be moved from its position of rest from left to right, (Fig. 4) during the exposure. A spring 12 tends to return said armature to its inoperative position when said magnet is deenergized. To return said grid from right to left (Fig. 4) to its starting position after the exposure is terminated, magnet 19, 20, 21 will be energized to cause its armature 21, situated upon one side of the lower section of said belt to clamp the latter between it and the magnet core 19 of said magnet, carried by said grid upon the other side of said belt section. A spring 22 tends to move said armature 21 away from its core 19 to unclamp said belt, when said magnet is deenergized.

Means are provided for regulating or adjusting the speed of the motor 4 and hence the speed of the grid 1. Within the scope of the invention any suitable means may be provided for this purpose, said means herein conveniently comprising a regulating resistance 80 herein conveniently mounted upon the switchboard 50 and illustratively constructed as shown in Figures 3 and 4. It comprises a regulating or adjusting lever 81 which is connected to the adjusting lever 61 of the time lag relay 60. In the drawings said lever 61 of said relay is set on the scale division 62. (See Fig. 5.) A lever 63 is controlled by the relay mechanism when the latter runs down, to open contact 64, 65 and thus switch off or disconnect the X-ray apparatus.

A switch 52 is connected to the shaft 51 of the operating switch of the X-ray apparatus. In the drawing said switch 52 is shown in its off position 53. Position 55 is the on position for operation of the apparatus to make an exposure.

Before starting an exposure, the operating switch is moved to the on or operating position, whereby switch 52 will be moved to position 55 (Fig. 4). This closes the circuit of motor 4 and of its regulating resistance 80, thus starting said motor and setting said belt 8 in motion. To make the exposure, a push button switch 66 on the switchboard 50 is closed, thus connecting winding 10 of electro-magnet 9, 10, 11 to the line wires 40, 41 through winding 68 of an electro-magnet 68, 69. Armature 69 of said magnet is thus operated to short-circuit the contact of press button switch 66, so that circuit of magnet winding 10 will remain closed even though said press button switch 66 be pressed only momentarily. Electro-magnet 9, 10, 11 clutches the grid to the travelling endless belt 8, thus setting said grid in motion. Shortly after said grid starts its movement, rail contact 30, carried by said grid, short-circuits contacts 31, 32, and connects conductors 33, 34, magnet 35, 36 which serves to short-circuit them, and winding 90, which controls the closing of switch 90, 91, to line wires 40, 41, through closed switch 77. Switch 91 of the X-ray apparatus is thus closed and primary 93 of the X-ray transformer or of the step transformer which serves to regulate the same, is connected to said line wires 40, 41.

Upon expiration of the time of exposure for which said time lag relay 60 is adjusted, lever 63, actuated by said relay, meets contact 65, separates it from contact 64 and thus breaks the supply circuit of electro-magnet winding 90, thus switching off the X-ray apparatus. Shortly thereafter, lever 15, carried by said grid 1, meets contact lever 17, separates it from contact 16, and thus breaks the supply circuit of said magnet winding 10, which results in making the magnet connection between said grid 1 and said travelling belt 8, and arrests the movement of said grid.

After making the exposure, said operating switch will be thrown into its off position, whereby contact lever 52 will be brought into position 53. In order to return said grid to its initial or starting position after making an exposure, switch 52 will be moved to position 54, whereby motor 4, which was cut out meanwhile, is again set in operation. Press button switch 76 will also be closed, thus connecting winding 20 of electro-magnet 19, 20, 21 to line wires 40, 41, magnet 19, 20, 21 being thus energized, clutches said grid to the lower section of said travelling belt 8 (Fig. 4). As the grid 1 reaches its initial starting position, lever 15 breaks the contacts 26, 27, and therefore the circuit of electro-magnet winding 20, thus arresting said grid-diaphragm in its starting position. Simultaneously contact lever 27 closes contacts 28, 29, thus switching on an incandescent lamp 78 mounted on the switchboard 50 to indicate that said grid has reached its initial position. Switch 77, which is firmly connected to press button switch 76, will be opened each time said switch 76 is operated, thus breaking the circuit of magnet winding 90. This is to prevent the X-ray apparatus from being switched on at the moment when in the return movement of said grid to its starting position, the rail-contact carried by said grid, glides over contacts 31, 32.

By the above arrangement for the first time adjustment of the speed of motion of the grid in dependence upon the selected time of exposure, and the return of said grid to its initial or starting position, from a switchboard, or other convenient point, is made possible. By the corresponding suitable construction of the controlling or regulating resistance 80, the occurrence of interfering band-shadows, on the film picture is prevented, as previously set forth.

Press button switch 76 could be replaced by a switch, operable, for example, by said automatic switch 91 of the X-ray apparatus, whenever said switch 91 is moved to off position. The return of said grid to its initial starting position would then be effected automatically after termination of an exposure.

Adjusting lever 81 of the regulating resistance 80, for regulating the speed of motion of said grid during the exposure, could be separate from adjusting lever 61 of said time lag relay. It is preferable, however, that said levers 61 and 81, be connected as above described in the illustrative embodiment of the invention herein shown, as this enables the time of exposure and speed of operation to be adjusted by a single handle.

If, instead of a time lag relay, a relay be used which cuts out the X-ray apparatus so soon as a definite quantity of current has been applied to the X-ray tube, I provide suitable means, actuated by the adjusting means of said last named relay, and which indicates the time of exposure. In such case the means for regulating or adjusting the speed of the grid will, in accordance with the present invention, be connected to the means for indicating the time of exposure, that is to say the means for indicating the time of exposure will replace the time lag relay of Figs. 4 and 5; in that case 61 would designate a hand actuated by the means for adjusting the quantity of current supplied to the X-ray tube, and which indicates the time of exposure upon a time scale, while lever 63 would designate a lever actuated by the operation of the relay which controls the quantity of current supplied to the X-ray tube.

I am aware that the invention may be embodied in other specific forms without departing from the spirit or essential attributes thereof, and I therefore desire the present embodiment of the invention to be considered in all respects as illustrative and not restrictive, reference being had to the appended claims rather than to the foregoing description to indicate the scope of the invention.

I claim:

1. In X-ray apparatus the combination of a movable, electrically driven Bucky grid for X-ray radiography; means for setting the period of exposure; and controlling means for regulating the speed of movement of said grid, said controlling means being coupled with said means for setting the period of exposure, whereby setting the period of exposure will automatically adjust the speed of the grid to correspond to the period of exposure.

2. In X-ray apparatus the combination of a movable, electrically driven Bucky grid for X-ray radiography; means for indicating the period of exposure; and controlling means for regulating the speed of movement of said grid, said controlling means being coupled with said indicating means, whereby operation of the latter will automatically adjust the speed of the grid to correspond thereto.

3. The combination of a power driven endless belt; a Bucky grid for X-ray radiography; two electromagnetic clamping means connected to said grid; and controlling means selectively operable to cause one of said clamping means to clamp said grid to that part of said belt moving in one direction and the other of said clamping means to clamp said grid to a part of said belt moving in the opposite direction.

4. In X-ray apparatus, the combination of a movable, electrically driven Bucky grid; means for setting the milliamperage to be supplied by said apparatus; means for setting the milliampere-seconds to be delivered by said apparatus for a radiograph; and controlling means for regulating the speed of said grid, said controlling means being coupled with said X-ray milliamperage setting means, whereby setting the milliamperage will automatically adjust the speed of the grid to correspond.

5. In X-ray apparatus, the combination of a movable, electrically driven Bucky grid; means for setting the milliamperage to be suppied by said apparatus; means for setting the milliampere-seconds to be delivered by said apparatus for an X-ray radiograph; and controlling means for regulating the speed of said grid, said controlling means being coupled with said means for setting the milliampere-seconds whereby setting the latter will automatically adjust the speed of the grid to correspond.

6. The combination of an electrically driven Bucky grid for X-ray radiography; means for regulating the speed of movement of said grid; and a scale for adjusting said regulating means, the graduations of said scale corresponding to such speeds only of said grid as will not produce shadows upon the radiograph.

7. In X-ray apparatus, the combination of an electrically driven Bucky grid movable in the same direction during the exposure period; driving means for moving said grid in opposite directions, said driving means being normally inoperative to move said grid; and means to render said driving means operable alternatively to move said grid in one or the other direction.

8. In X-ray apparatus, the combination of an electrically driven Bucky grid movable in the same direction during the exposure period; driving means adapted to move said grid in opposite directions, said driving means being normally inoperative to move said grid; mechanism adapted operatively to connect said driving means to said grid; and means to actuate said mechanism operative to connect said driving means to said grid alternatively to move said grid in one or the other direction.

9. In X-ray apparatus, the combination of an electrically driven Bucky grid for X-ray radiography; a multi-contact resistance regulator for regulating the speed of movement of said grid; and means to variably adjust said regulator to drive said grid at such speeds only as will not produce band shadows on the radiograph.

10. The combination of an electrically driven Bucky grid, movable in the same direction during the exposure period; and two electric devices selectively controlled, the one to move said grid from starting position to its opposite terminal position in one direction, and the other to move said grid from said terminal position back to its starting position.

GUSTAV GROSSMANN.